(12) United States Patent
Miyazaki et al.

(10) Patent No.: US 10,788,726 B1
(45) Date of Patent: Sep. 29, 2020

(54) OPTICAL MODULATOR AND OPTICAL TRANSMISSION APPARATUS USING THE SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/665,222

(22) Filed: Oct. 28, 2019

(30) Foreign Application Priority Data

Mar. 27, 2019 (JP) ................................. 2019-061560

(51) Int. Cl.
| | |
|---|---|
| *G02F 1/225* | (2006.01) |
| *G02B 6/12* | (2006.01) |
| *G02B 26/02* | (2006.01) |
| *G02B 6/293* | (2006.01) |

(52) U.S. Cl.
CPC ........... *G02F 1/2255* (2013.01); *G02B 26/02* (2013.01); *G02F 1/2252* (2013.01); *G02B 6/2935* (2013.01); *G02B 2006/12142* (2013.01)

(58) Field of Classification Search
CPC .............................. G02F 1/2255; G02F 1/2252
See application file for complete search history.

(56) References Cited

U.S. PATENT DOCUMENTS

| | | | | |
|---|---|---|---|---|
| 9,231,728 | B2* | 1/2016 | Sugiyama | ............... H04J 14/06 |
| 10,088,698 | B1* | 10/2018 | Ishikawa | ............... G02F 1/0121 |
| 10,091,881 | B1* | 10/2018 | Kataoka | ................. H05K 3/363 |
| 10,473,999 | B2* | 11/2019 | Miyazaki | ........... G02B 6/29352 |
| 10,477,677 | B2* | 11/2019 | Miyazaki | ............... H05K 1/117 |
| 2012/0051683 | A1* | 3/2012 | Sugiyama | ............. G02F 1/0327 |
| | | | | 385/1 |
| 2013/0027762 | A1* | 1/2013 | Sugiyama | ............ H05K 1/0215 |
| | | | | 359/245 |

FOREIGN PATENT DOCUMENTS

JP    2012-156947    8/2012

* cited by examiner

*Primary Examiner* — Sung H Pak
(74) *Attorney, Agent, or Firm* — Rankin, Hill & Clark LLP

(57) ABSTRACT

An optical modulator includes an optical modulation element having a plurality of signal electrodes; a plurality of signal input terminals each of which inputs an electrical signal to be applied to each signal electrode; a relay substrate on which a plurality of signal conductor patterns electrically connecting the signal input terminals and the signal electrodes, and a plurality of ground conductor patterns are formed; and a housing that houses the optical modulation element and the relay substrate, in which the relay substrate has at least one groove extending from the signal input side on which the signal input terminal is connected to the signal conductor pattern, in at least one ground conductor pattern formed between adjacent signal conductor patterns, and the groove is formed such that a length extending from the signal input side is longer than a length of the signal input terminal extending on the signal conductor pattern.

11 Claims, 7 Drawing Sheets

DETAILED VIEW OF PART A

DETAILED VIEW OF PART A

OPTICAL MODULATOR AND OPTICAL TRANSMISSION APPARATUS USING THE SAME

CROSS-REFERENCE TO RELATED APPLICATIONS

This application claims the benefit of Japanese Patent Application No. 2019-061560 filed Mar. 27, 2019, the disclosure of which is herein incorporated by reference in its entirety.

BACKGROUND OF THE INVENTION

Field of the Invention

The present invention relates to an optical modulator including a relay substrate that relays propagation of an electrical signal between a signal input terminal and an optical modulation element electrode, and an optical transmission apparatus using the optical modulator.

Description of Related Art

In a high-speed/large-capacity optical fiber communication system, an optical modulator incorporating a waveguide type optical modulation element is often used. Among these, optical modulation elements in which $LiNbO_3$ (hereinafter, also referred to as LN) having an electro-optic effect is used for substrates has a small light loss and can realize a wide band optical modulation characteristic, so the optical modulation elements are widely used for high-frequency/large-capacity optical fiber communication systems.

In an optical modulation element using the LN substrate, a Mach-Zehnder type optical waveguide and a signal electrode for applying a high-frequency electrical signal as a modulation signal to the optical waveguide are provided. The signal electrodes provided in the optical modulation element are connected to lead pins or connectors which are signal input terminals provided on the housing, through a relay substrate provided in the housing of the optical modulator accommodating the optical modulation element. Since the lead pins and connectors that are signal input terminals are connected to a circuit board on which an electronic circuit for causing the optical modulator to perform a modulation operation, an electrical signal output from the electronic circuit is applied to the signal electrodes of the optical modulation element through the relay substrate.

Due to the increasing transmission capacity in recent years, the main stream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into a metro networks.

An optical modulator that performs QPSK modulation (QPSK optical modulator) and an optical modulator that performs DP-QPSK modulation (DP-QPSK optical modulator) each include a plurality of Mach-Zehnder optical waveguides in a nest structure called so-called nested type, each of which includes at least one signal electrode. Therefore, these optical modulators are provided with a plurality of signal electrodes, and the above-described DP-QPSK modulation operation is performed in cooperation with high-frequency electrical signals applied to these signal electrodes.

In the optical modulator in which high-frequency electrical signals applied to the plurality of signal electrodes cooperate, all the high-frequency electrical signals are required to be input to the signal electrodes of the optical modulation element without being affected by noise or the like. However, on the other hand, the demand for downsizing of the optical modulator is unchanged, and the downsizing of the relay substrate is progressing with downsizing of the housing of the optical modulator. As a result, a plurality of different high-frequency signals propagate in close proximity to a narrow relay substrate, and electrical crosstalk between high-frequency signal lines formed on the relay substrate is becoming impossible to ignore.

In addition, commercial DP-QPSK modulators are often used at a transmission rate of 100 Gb/s at present, but development for increasing the transmission rate to 400 Gb/s is also in progress. If the transmission rate is increased in the future, the problem of crosstalk between the high-frequency signal lines generated in the relay substrate may become a more serious problem.

As a method of suppressing the crosstalk, it is conceivable to increase the distance between adjacent high-frequency signal lines, but this method is contrary to the demand for downsizing of the optical modulator as described above, and is difficult to adopt. Therefore, a method of providing, for example, vias in the ground electrodes provided between the high-frequency signal lines and connecting them to the ground layer on the rear surface of the relay substrate, and strengthen the ground electrodes to increase the shielding effect between the high-frequency signal lines is adopted (see, for example, Japanese Laid-open Patent Publication No. 2012-156947).

However, in the DP-QPSK modulator having a high transmission rate of 400 Gb/s or more, there is a problem that the crosstalk cannot be sufficiently suppressed only by the vias as described above.

According to experiments conducted by the inventor of the present invention, in the DP-QPSK modulator having the high transmission rate as described above, with respect to the above crosstalk, the influence of leakage of the high-frequency signal at the input portion accompanying not only the direct transfer of signal energy between adjacent high-frequency signal lines, but also the occurrence of signal propagation mode conversion (hereinafter referred to as propagation mode conversion) mainly at the high-frequency signal input part (signal input part) of the relay substrate cannot be ignored.

That is, since a connector, a lead pin, or the like is generally used for inputting a high-frequency signal to the optical modulator, the high-frequency signal propagates in a coaxial mode until it is input to the relay substrate. On the other hand, the high-frequency signal line provided on the optical modulation element substrate or the relay substrate is generally a coplanar line, and the propagation mode in the line is a coplanar mode (hereinafter, referred to as CPW mode).

Therefore, in the signal input part of the relay substrate, propagation mode conversion from the coaxial mode to the CPW mode (that is, different mode conversion) occurs, and a part of the energy of the high-frequency signal propagating in the coaxial mode is released in a radiation mode to the inside or outside (to the air) of the relay substrate. A part of the high-frequency signal energy released to the inside or outside (to the air) of the relay substrate additionally acts on the occurrence of the crosstalk.

SUMMARY OF THE INVENTION

From the above background, in an optical modulator including a relay substrate that electrically connects each of the signal electrodes of the optical modulation element and each of the signal input terminals, it is required to effectively suppress the increase in crosstalk between the signal conductor patterns on the relay substrate due to an increase in a transmission rate, and realize good optical modulation characteristics.

According to an aspect of the present invention, there is provided an optical modulator including: an optical modulation element having a plurality of signal electrodes; a plurality of signal input terminals each of which inputs an electrical signal to be applied to each of the signal electrodes; a relay substrate on which a plurality of signal conductor patterns that electrically connect each of the signal input terminals to each of the signal electrodes, and a plurality of ground conductor patterns are formed; and a housing that houses the optical modulation element and the relay substrate, in which on a signal input side of the relay substrate where the electrical signal from the signal input terminal is input to the signal conductor pattern, the signal input terminal is disposed to extend from the signal input side onto the signal conductor pattern, in which the relay substrate has at least one groove extending from the signal input side, in at least one ground conductor pattern formed between the signal conductor patterns adjacent to each other, on a front surface on which the signal conductor pattern is formed, and in which the groove is formed such that a length of the groove extending from the signal input side is longer than a length of the signal input terminal extending from the signal input side.

According to another aspect of the present invention, the groove extends up to a signal output side of the relay substrate where an electrical signal is output from the signal conductor pattern to the signal electrode of the optical modulation element.

According to another aspect of the present invention, the groove is formed such that a depth of an end of the groove measured from the front surface at the signal input side is deeper than a depth of the groove measured from the front surface at the other end of the groove.

According to another aspect of the present invention, the groove is formed such that the depth measured from the front surface is deepened stepwise or continuously from the other end of the groove toward the signal input side.

According to another aspect of the present invention, the groove is formed up to a rear surface of the relay substrate facing the front surface at the signal input side, or is formed up to a rear surface of the relay substrate facing the front surface within a range of a predetermined distance from the signal input side.

According to another aspect of the present invention, a metal film is formed on the inner surface of the groove or on the inner surface and the bottom surface of the groove.

According to another aspect of the present invention, a metal film is formed on the inner surface and the bottom surface of the groove, a ground conductor is formed on a rear surface of the relay substrate facing the front surface, and a via for connecting the metal film on the bottom surface and the ground conductor on the rear surface is formed on the bottom surface of the groove.

According to another aspect of the present invention, the groove does not extend up to a signal output side of the relay substrate where an electrical signal is output from the signal conductor pattern to the signal electrode of the optical modulation element, and the entire groove is formed so as to penetrate to a rear surface of the relay substrate facing the front surface.

According to another aspect of the present invention, a metal film is formed on an inner surface of the groove.

According to another aspect of the present invention, the groove is formed such that a length of the groove extending from the signal input side is longer than a width of the groove measured along a direction orthogonal to a direction of the extension.

Another aspect of the present invention is an optical transmission apparatus including any one of the optical modulators described above and an electronic circuit that outputs an electrical signal for causing the optical modulator to perform a modulation operation.

According to the present invention, in an optical modulator provided with a relay substrate, it is possible to effectively suppress an increase in crosstalk between signal conductor patterns on the relay substrate due to an increase in a transmission rate, and to realize good optical modulation characteristics.

DETAILED DESCRIPTION OF THE INVENTION

In order to solve the above-described problems, in the following embodiments and modification examples thereof, an increase in crosstalk between adjacent signal conductor patterns on the relay substrate due to an increase in transmission rate is suppressed, without violating the demand for downsizing of the optical modulator, at the same level as or lower than the cost in the related art, and also considering manufacturability. Specifically, two radiation microwaves of a radiation mode generated by the signal conductor pattern as the high-frequency waves propagate through the signal conductor patterns on the relay substrate (hereinafter referred to as propagation radiation microwaves) and a radiation mode generated along with the different mode conversion at the connection point between the signal input terminal and the signal conductor pattern (hereinafter referred to as connection point radiation microwaves) are simultaneously suppressed from propagating through the relay substrate, and the generation of high-frequency energy transfer between adjacent signal conductor patterns is suppressed. Hereinafter, embodiments of the present invention will be described with reference to the drawings.

First Embodiment

Figure 1:
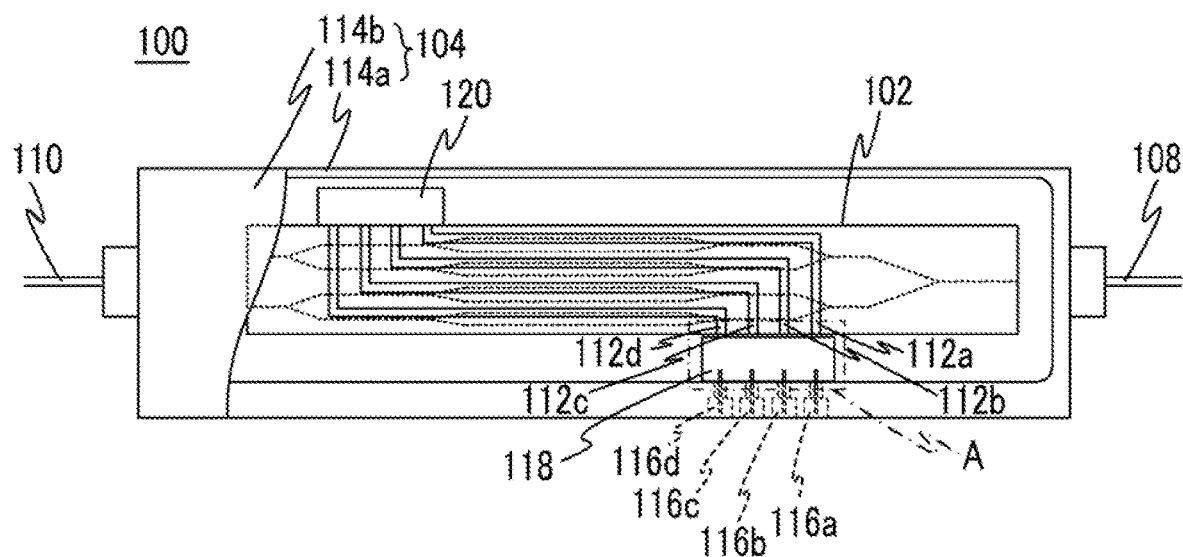
FIG. 1 is a plan view of an optical modulator according to a first embodiment of the present invention.
Figure 2:
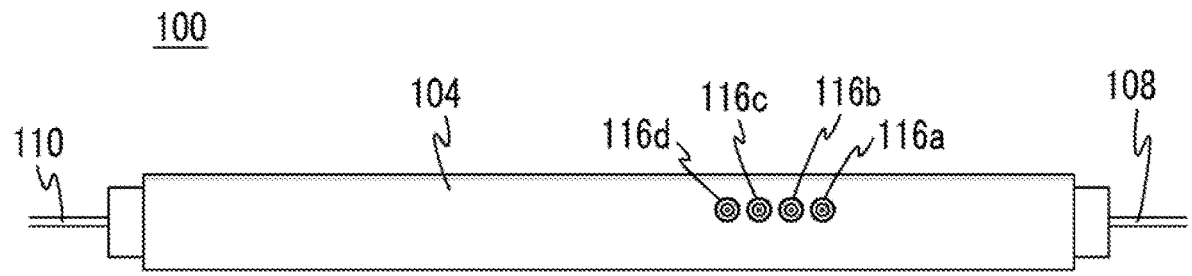
FIG. 2 is a side view of the optical modulator shown in FIG. 1.

First, a first embodiment of the present invention will be described. FIGS. 1 and 2 are diagrams showing a configuration of an optical modulator 100 according to the first embodiment of the present invention. Here, FIGS. 1 and 2 are a plan view and a side view of the optical modulator 100, respectively.

The optical modulator 100 includes an optical modulation element 102, a housing 104 that houses the optical modulation element 102, an input optical fiber 108 for inputting light into the optical modulation element 102, and an output optical fiber 110 that guides the light output from the optical modulation element 102 to the outside of the housing 104.

The optical modulation element 102 is a DP-QPSK modulator that performs optical modulation of 400 Gb/s, for example, and includes, for example, four Mach-Zehnder type optical waveguides provided on an LN substrate. The four Mach-Zehnder type optical waveguides are provided with four signal electrodes 112a, 112b, 112c, and 112d that respectively modulate light waves propagating through the Mach-Zehnder type optical waveguide. As known in the related art, on the surface of the LN substrate of the optical modulation element 102, for example, ground electrodes 122a, 122b, 122c, 122d, and 122e (not shown in FIG. 1, and shown in FIG. 3) constituting a coplanar waveguide (CPW) are provided for the four signal electrodes 112a, 112b, 112c, and 112d.

Specifically, the ground electrodes 122a, 122b, 122c, 122d, and 122e are disposed so as to sandwich the signal electrodes 112a, 112b, 112c, and 112d therebetween in the surface of the LN substrate surface, and constitute a coplanar waveguide having a predetermined characteristic impedance in a predetermined operating frequency together with the four signal electrodes 112a, 112b, 112c, and 112d.

Four high-frequency electrical signals (modulation signals) are input to the four signal electrodes 112a, 112b, 112c, and 112d, respectively. These high-frequency electrical signals cooperate to control the propagation of the light wave in the four Mach-Zehnder type optical waveguides, and perform the operation of DP-QPSK modulation of 400 Gb/s as a whole.

The two light rays output from the optical modulation element 102 are polarized and combined by a lens optical system (not shown), for example, and guided to the outside of the housing 104 through the output optical fiber 110.

The housing 104 includes a case 114a to which the optical modulation element 102 is fixed, and a cover 114b. In order to facilitate understanding of the configuration inside the housing 104, only a part of the cover 114b is shown on the left side in FIG. 1, but actually, the cover 114b is disposed to cover the entire box-shaped case 114a and hermetically seals the inside of the housing 104. The case 114a is made of a metal or a ceramic plated with gold, for example, and functions electrically as an electric conductor. The housing 104 is usually provided with a plurality of pins for DC control or the like, which are omitted in FIG. 1.

The case 114a includes electrical connectors 116a, 116b, 116c, and 116d having signal input terminals 124a, 124b, 124c, and 124d for inputting high-frequency electrical signals respectively applied to the signal electrodes 112a, 112b, 112c, 112d of the optical modulation element 102. In addition, a relay substrate 118 is accommodated in the housing 104. As will be described later, the relay substrate 118 has signal conductor patterns 330a, 330b, 330c, and 330d that electrically connect the signal input terminals 124a, 124b, 124c, and 124d and one ends of the signal electrodes 112a, 112b, 112c, and 112d of the optical modulation element 102 respectively, and ground conductor patterns 340a, 340b, 340c, 340d, and 340e.

The other ends of the signal electrodes 112a, 112b, 112c, and 112d of the optical modulation element 102 are terminated by a terminator 120 having a predetermined impedance. Thus, the electrical signals input to the one ends of the signal electrodes 112a, 112b, 112c, and 112d propagate in the signal electrodes 112a, 112b, 112c, and 112d as traveling waves.

Each of the electrical connectors 116a, 116b, 116c, and 116d is, for example, a socket of a push-on type coaxial connector. The cylindrical ground conductors of these electrical connectors 116a, 116b, 116c, and 116d are electrically connected and fixed to the case 114a. Therefore, the case 114a corresponds to a structure connected to the ground potential. The signal input terminals 124a, 124b, 124c, and 124d are, for example, center conductors (core wires) extending along the cylindrical center lines of the ground conductors in the connector sockets that are the electrical connectors 116a, 116b, 116c, and 116d.

Figure 3:
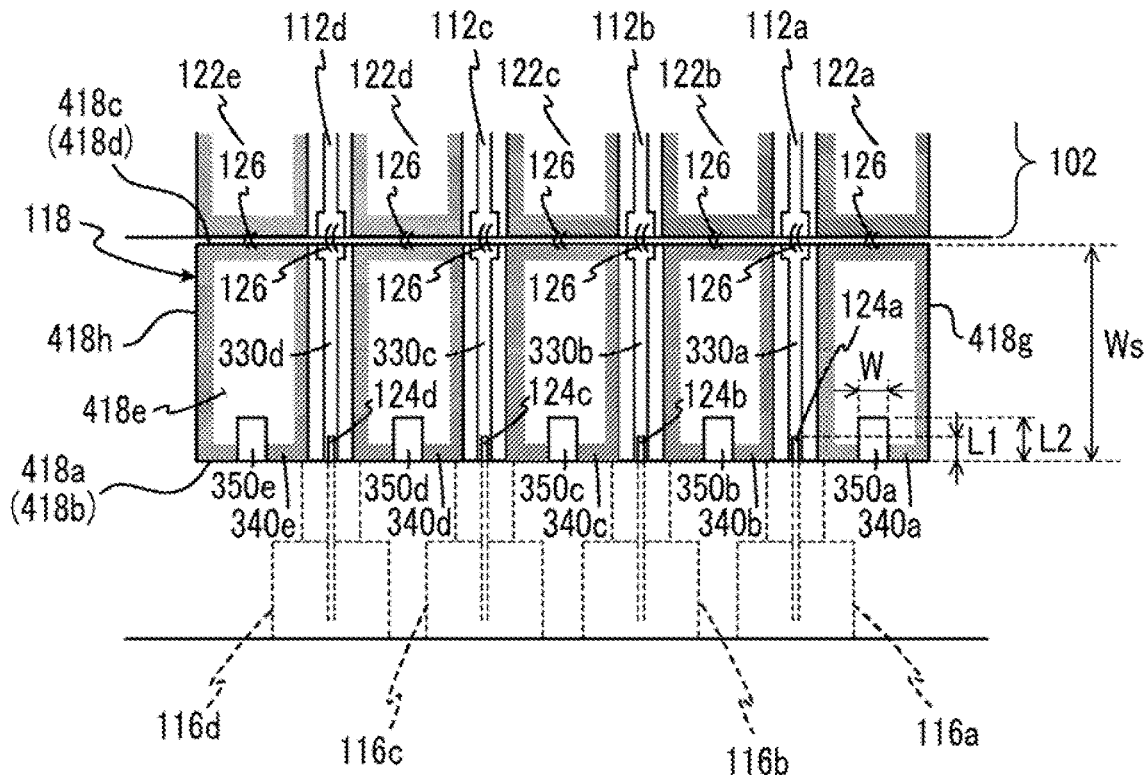
FIG. 3 is a detailed view of part A of the optical modulator shown in FIG. 1.
Figure 4:
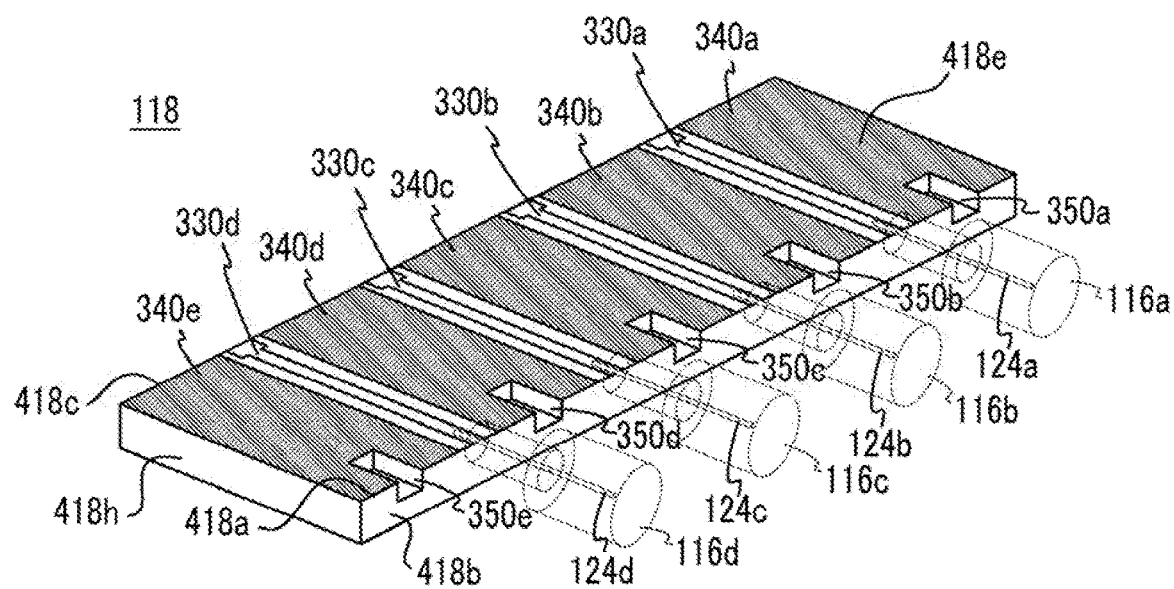
FIG. 4 is a perspective view of a front surface of a relay substrate used in the optical modulator shown in FIG. 1 as viewed from a side where signal input terminals are disposed.

FIG. 3 is a partial detail view of a part A in FIG. 1, and shows a configuration of the relay substrate 118 and its surroundings. FIG. 4 is a perspective view of the front surface 418e (the surface shown in FIGS. 1 and 3) of a single relay substrate 118 as viewed from the side where the signal input terminal 124a and the like are disposed.

The signal conductor patterns 330a, 330b, 330c, and 330d and the ground conductor patterns 340a, 340b, 340c, 340d, and 340e are provided on the front surface 418e of the relay substrate 118.

The ground conductor patterns 340a, 340b, 340c, 340d, and 340e are provided so as to sandwich the signal conductor patterns 330a, 330b, 330c, and 330d in the surface of the front surface 418e of the relay substrate 118. Thus, the signal conductor patterns 330a, 330b, 330c, and 330d constitute coplanar lines together with the ground conductor patterns 340a, 340b, 340c, 340d, and 340e, respectively.

As shown in FIG. 3, the signal electrodes 112a, 112b, 112c, and 112d of the optical modulation element 102 are electrically connected to one ends of the signal conductor patterns 330a, 330b, 330c, and 330d of the relay substrate 118, respectively, by wire bonding using the conductor wires 126, for example. Here, the conductor wire 126 can be a gold wire, for example.

Further, in the optical modulation element 102, the ground electrodes 122a, 122b, 122c, 122d, and 122e that constitute the coplanar line together with the signal electrodes 112a, 112b, 112c, and 112d are electrically connected to one ends of the ground conductor patterns 340a, 340b, 340c, 340d, and 340e of the relay substrate 118, respectively, by wire bonding using the conductor wires 126, for example, in the same manner as described above. The wire bonding using the conductor wire 126 described above is an example, and the present invention is not limited to this. Instead of wire bonding of the conductor wire 126, ribbon bonding using a conductor ribbon such as a gold ribbon can be used.

As shown in FIGS. 3 and 4, the signal input terminals 124a, 124b, 124c, and 124d of the electrical connectors 116a, 116b, 116c, and 116d disposed on the case 114a of the housing 104 are fixed and electrically connected to the other ends of the signal conductor patterns 330a, 330b, 330c, and 330d of the relay substrate 118, respectively. These fixing and electrical connection can be performed by using solder, brazing material, or conductive adhesive, for example.

Here, the side of the relay substrate 118 on which the signal conductor patterns 330a, 330b, 330c, and 330d and the signal input terminals 124a, 124b, 124c, and 124d are respectively connected is referred to as a signal input side 418a, and a side surface of the relay substrate 118 having the signal input side 418a as one side is referred to as an input side surface 418b. Further, the side of the relay substrate 118 that faces the signal input side 418a, that is, the side where the signal conductor patterns 330a, 330b, 330c, and 330d and the signal electrodes 112a, 112b, 112c, and 112d of the optical modulation element 102 are connected is referred to as a signal output side 418c, and the side of the relay substrate 118 having the signal output side 418c as one side is referred to as an output side surface 418d. In FIG. 3, of the relay substrate 118, the side surface on the right side in FIG. 3 orthogonal to the input side surface 418b is referred to as a right side surface 418g, and the side surface on the left side in FIG. 3 is referred to as a left side surface 418h. Further, the surface of the relay substrate 118 that faces the front surface 418e is referred to as a rear surface 418f.

As shown in FIG. 3, the signal input terminals 124a, 124b, 124c, and 124d of the electrical connectors 116a, 116b, 116c, and 116d are disposed on the signal conductor patterns 330a, 330b, 330c, and 330d of the relay substrate 118 so as to extend from the signal input side 418a with a predetermined length L1. Here, the portions where the signal conductor patterns 330a, 330b, 330c, and 330d are connected to the signal input terminals 124a, 124b, 124c, and 124d on the signal input side 418a and the vicinity thereof are referred to as input connection points.

In particular, in the relay substrate 118 of the optical modulator 100 according to the present embodiment, on the front surface 418e where the signal conductor patterns 330a, 330b, 330c, and 330d are formed, grooves 350a, 350b, 350c, 350d, and 350e extending from the signal input side 418a (or the input side surface 418b) are provided in the ground conductor patterns 340a, 340b, 340c, 340d, and 340e. Further, the grooves 350a, 350b, 350c, 350d, and 350e have a predetermined depth from the front surface 418e of a single relay substrate 118 (not penetrating the relay substrate 118). Here, in the present embodiment, as an example, the grooves 350a, 350b, 350c, 350d, and 350e are configured to have the same size as each other.

Hereinafter, the signal electrodes 112a, 112b, 112c, and 112d of the optical modulation element 102 are collectively referred to as the signal electrode 112, and the ground electrodes 122a, 122b, 122c, 122d, and 122e are collectively referred to as the ground electrode 122. Further, the electrical connectors 116a, 116b, 116c, and 116d are collectively referred to as the electrical connector 116, and the signal input terminals 124a, 124b, 124c, and 124d are collectively referred to as the signal input terminal 124. Further, the signal conductor patterns 330a, 330b, 330c, and 330d of the relay substrate 118 are collectively referred to as the signal conductor pattern 330, and the ground conductor patterns 340a, 340b, 340c, 340d, and 340e are collectively referred to as the ground conductor pattern 340. Further, the grooves 350a, 350b, 350c, 350d, and 350e are collectively referred to as a groove 350.

Here, since the four signal input terminals 124 are the central conductors of the four electrical connectors 116 that are coaxial connectors as described above, the propagation mode of the high-frequency electrical signal propagating through the signal input terminals 124 is the coaxial mode. In addition, as described above, the signal conductor patterns 330 on the relay substrate 118 constitute a coplanar line together with the six ground conductor patterns 340, and propagate high-frequency electrical signals in the coplanar mode (CPW mode).

Therefore, at the input connection point where the signal conductor pattern 330 is connected to the signal input terminal 124, the propagation mode conversion (different mode conversion) from the coaxial mode to the CPW mode occurs. Therefore, at each of the input connection points, connection point radiation microwaves are generated along with the different mode conversion and can propagate inside the relay substrate 118.

The signal conductor pattern 330 of the relay substrate 118 generates propagation radiation microwaves when a high-frequency electrical signal propagates in the longitudinal direction starting from the input connection point, and the propagation radiation microwaves can propagate in the relay substrate 118. The propagation radiation microwave can be generated from each part in the longitudinal direction of the signal conductor pattern 330, and the generation intensity thereof generally has a maximum intensity at an input connection point, for example, and decreases as it goes away from the signal input side 418a.

In the optical modulator 100 having the above configuration, since the ground conductor pattern 340 is provided with the groove 350 extending from the signal input side 418a, the connection point radiation microwaves that can be generated at the input connection point and propagation radiation microwaves generated in the vicinity of the input connection point of the signal conductor pattern 330 are prevented from propagating inside the relay substrate 118 by the air walls formed by the grooves 350, respectively.

In other words, in the optical modulator 100, the transfer of high-frequency energy between the signal conductor patterns 330 through each of the connection radiation microwave and the propagation radiation microwave is suppressed by the presence of the groove 350.

As a result, even in a case where the optical modulator 100 is operated at a transmission rate of 400 Gb/s or higher, the distance between the signal conductor patterns 330 is not increased (thus, the relay substrate 118 and the optical modulator 100 are not increased in size), and the crosstalk between the signal conductor patterns 330 can be effectively reduced at a cost equal to or lower than that in the related art, so good optical modulation characteristics can be realized.

Here, according to the knowledge of the inventors of the present invention, it is preferable that the size of the groove 350 has any of the following relationships, when the length of the signal input terminal 124 extending from the signal input side 418a on the signal conductor pattern 330 is L1, the length of the groove 350 extending from the signal input side 418a is L2, and the width measured in the direction orthogonal to the longitudinal direction is W (see FIG. 3). Here, the length L1 is a length of the signal input terminal 124 extending on the signal conductor pattern 330 from the signal input side 418a as described above. Hereinafter, the length L1 is referred to as a terminal extension length L1.

$$L2 > L1 \quad (1)$$

$$L2 > W \quad (2)$$

The length L2 is a length in which the groove 350 extends from the signal input side 418a along the groove 350, and is not a distance between the signal input side 418a and the end of the groove 350 in a direction orthogonal to the signal input side 418a. For example, in a case where the groove 350 is formed in a curved line instead of a straight line, the length is measured along the curved line (for example, the length in which the center line in the width direction of the groove 350 extends). In addition, in a case where the width W varies along the extending direction of the groove 350, the width W can be set to the average value or the maximum value of the width in each portion.

Expression (1) means that the signal input terminal 124 is configured such that the length L2 of the groove 350 extending from the signal input side 418a is longer than the terminal extension length L1 extending from the signal input side 418a. Here, it is desirable that L2>L1 because the connection point radiation microwave can be generated over the range of the terminal extension length L1 at the input connection point, so when the length L2 of the groove is shorter than the terminal extension length L1, the effect of suppressing propagation of the connection point radiation microwaves is reduced.

Further, Expression (2) means that the groove 350 is formed such that the length L2 extending is longer than the width W measured along the direction orthogonal to the direction extending from the signal input side 418a. Here, it is desirable that L2>W because the propagation radiation microwave that can be generated from the signal conductor pattern 330 in the vicinity of the signal input side 418a may not be suppressed when the length L2 of the groove 350 is shorter than the width W and because the width of the groove 350 may be unnecessarily increased, and the mechanical strength of the relay substrate 118 may be reduced when W>L2.

In FIG. 3, the signal input terminal 124a and the groove 350a are taken as an example, and the terminal extension length L1 and the length L2 and width W of the groove 350 are shown, but these can be defined similarly for the other grooves 350b, 350c, 350d, and 350e. In the present embodiment, the five grooves 350 are formed to have the same size as each other, but the present invention is not limited to this. As long as the relationship of Expression (1) or Expression (2) is satisfied in each of the grooves 350, the grooves 350 may be configured to have different sizes. The above-described terminal extension length L1, the length L2 and width W of the groove 350, and the preferable conditions shown in Expression (1) or Expression (2) are the same even in the first to fifth modification examples to be described later and can be applied thereto.

Further, if a metal film is formed on the inner surface of the groove 350 (if metallization is performed), the effect of suppressing the propagation of the connection point radiation microwaves and the propagation radiation microwaves into the relay substrate 118 can be further enhanced. The metal films are desirably provided on at least two inner surfaces of the inner surfaces of the grooves 350 facing each other in the direction of the signal input side 418a. In addition to this, it is more desirable that a metal film is also formed on the bottom surface (a surface parallel to the front surface 418e) and/or the end surface (a surface parallel to the input side surface 418b) of the groove 350.

In the present embodiment, one groove 350 is provided in each of the five ground conductor patterns 340, but the present invention is not limited to this. From the viewpoint of reducing crosstalk between the adjacent signal input terminals 124 and/or between the adjacent signal conductor patterns 330, the ground conductor patterns 340 (that is, in the present embodiment, the ground conductor patterns 340b, 340c, and 340d) formed between at least the adjacent signal conductor patterns 330 may have at least one groove 350.

However, if the groove 350 is also formed in the ground conductor patterns 340a, 340e that are not sandwiched between the adjacent signal conductor patterns 330 as in the present embodiment, the propagation of connection point radiation microwaves and propagation radiation microwaves, which are generated from, for example, the input connection point of the outermost signal conductor patterns 330a, 330d and propagate to and reflected on the right side surface 418g and the left side surface 418h orthogonal to the input side surface 418b of the relay substrate 118 can be reduced. Thereby, for example, the connection point radiation microwaves and the propagation radiation microwaves generated from the signal conductor patterns 330a, 330d and returning to themselves are reduced, and noise generated in the signal conductor patterns 330a, 330d caused by the reflected microwaves returning can be reduced.

In the present embodiment, one ground conductor pattern 340 is provided between the adjacent signal conductor patterns 330, but the present invention is not limited to this. There may be a plurality of ground conductor patterns 340 provided between adjacent signal conductor patterns 330. In this case, a groove similar to the groove 350 can be formed in at least one ground conductor pattern 340 provided between adjacent signal conductor patterns 330. Alternatively, a groove similar to the groove 350 can be provided in the ground conductor pattern 340 which is adjacent to each of the signal conductor patterns 330 (closest to each of the signal conductor patterns 330), among the plurality of ground conductor patterns 340 provided between the adjacent signal conductor patterns 330.

In the present embodiment, each of the signal conductor patterns 330 is formed as a linear shape extending in a direction orthogonal to the signal input side 418a as an example, but the present invention is not limited thereto. The signal conductor pattern 330 is formed in a straight line or a curved line that is not orthogonal to the signal input side 418a, according to the interval between the signal input terminals 124, the interval between the signal electrodes 112 in the optical modulation element 102, or other electrical requirements.

In FIG. 3, the pattern interval between the signal conductor pattern 330 and the ground conductor pattern 340 is illustrated as being substantially constant, but the present invention is not limited thereto. The patterns may be formed at different intervals, for example, in the part in the range of the length L2 from the signal input side 418a in which the groove 350 is formed and the other parts such that the distributed impedance of the coplanar line formed by the signal conductor pattern 330 and the ground conductor pattern 340 is in a predetermined value range in the operating frequency range of the optical modulation element 102, according to the technique in the related art.

Next, a modification example of the relay substrate 118 that can be used in the optical modulator 100 according to the first embodiment will be described.

First Modification Example

Figure 5:
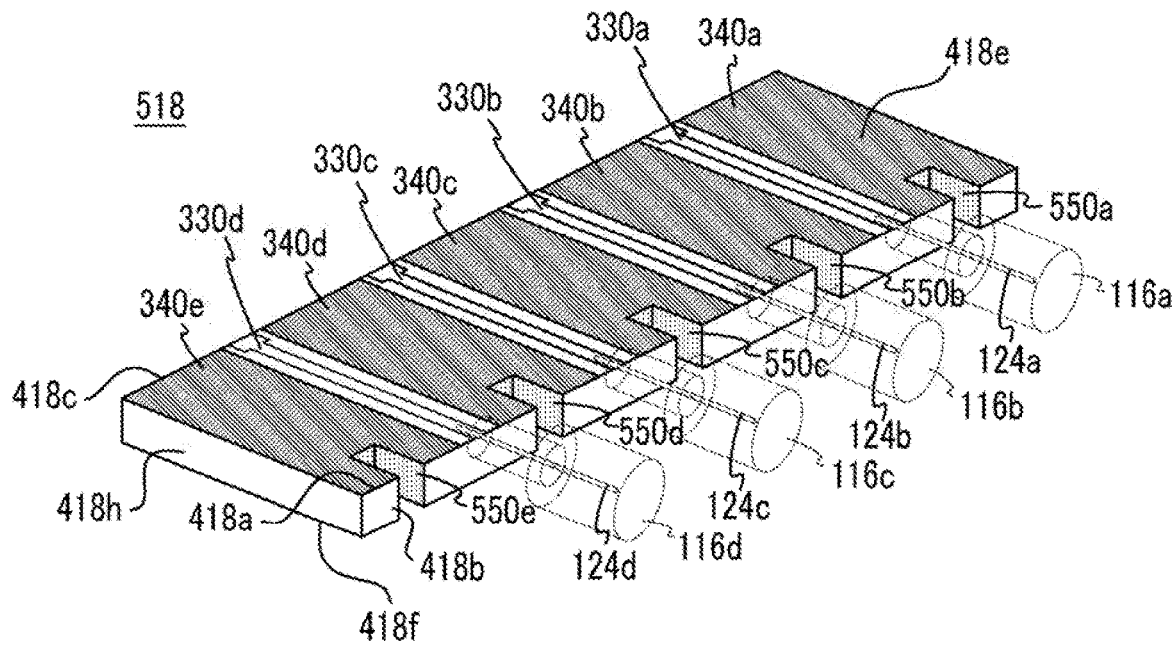
FIG. 5 is a diagram illustrating a first modification example of the relay substrate used in the optical modulator according to the first embodiment.

FIG. 5 is a diagram illustrating a configuration of a relay substrate 518 according to a first modification example. The relay substrate 518 can be used instead of the relay substrate 118 in the optical modulator 100 shown in FIG. 1. In FIG. 5, the same reference numerals as those in FIG. 4 are used for the same components as those of the relay substrate 118 shown in FIG. 4, and the above description of FIG. 4 is adopted.

The relay substrate 518 shown in FIG. 5 has the same configuration as that of the relay substrate 118 shown in FIG. 4, except that grooves 550a, 550b, 550c, 550d, and 550e are provided instead of the grooves 350a, 350b, 350c, 350d, and 350e. The grooves 550a, 550b, 550c, 550d, and 550e have the same configuration as the grooves 350a, 350b, 350c, 350d, and 350e, but are different in that the grooves do not extend up to a signal output side 418c of the relay substrate 518, where an electrical signal is output from the signal conductor pattern 330 to the signal electrode 112 of the optical modulation element 102, and the entire of each of the grooves 550a, 550b, 550c, 550d, and 550e is formed so as to penetrate to the rear surface 418f facing the front surface 418e, from the front surface 418e of the relay substrate 518.

Further, the grooves 550a, 550b, 550c, 550d, and 550e are different from the grooves 350a, 350b, 350c, 350d, and 350e in that metal films are formed on three inner surfaces of the grooves, respectively (metallized). Hereinafter, the grooves 550a, 550b, 550c, 550d, and 550e are collectively referred to as a groove 550.

The relay substrate 518 having the above-described configuration is formed such that the entire of each of the grooves 550 extending from the signal input side 418a on the front surface 418e of the relay substrate 518 penetrate to the rear surface 418f of the relay substrate 518. Therefore, propagation of the two connection point radiation microwaves and propagation radiation microwaves generated at the input connection point and the vicinity thereof into the relay substrate 518 is further suppressed as compared with the relay substrate 118 shown in FIG. 4. Further, in the present modification example, since the metal film is formed on all three inner surfaces of the groove 550, the effect of suppressing the propagation of the connection point radiation microwave and the propagation radiation microwave is strengthened than that of the relay substrate 118. Thus, the effect of reducing the transfer of high-frequency energy between the signal conductor patterns 330 through the connection radiation microwave and the propagation radiation microwave is further enhanced as compared with the relay substrate 118.

Second Modification Example

Figure 6:
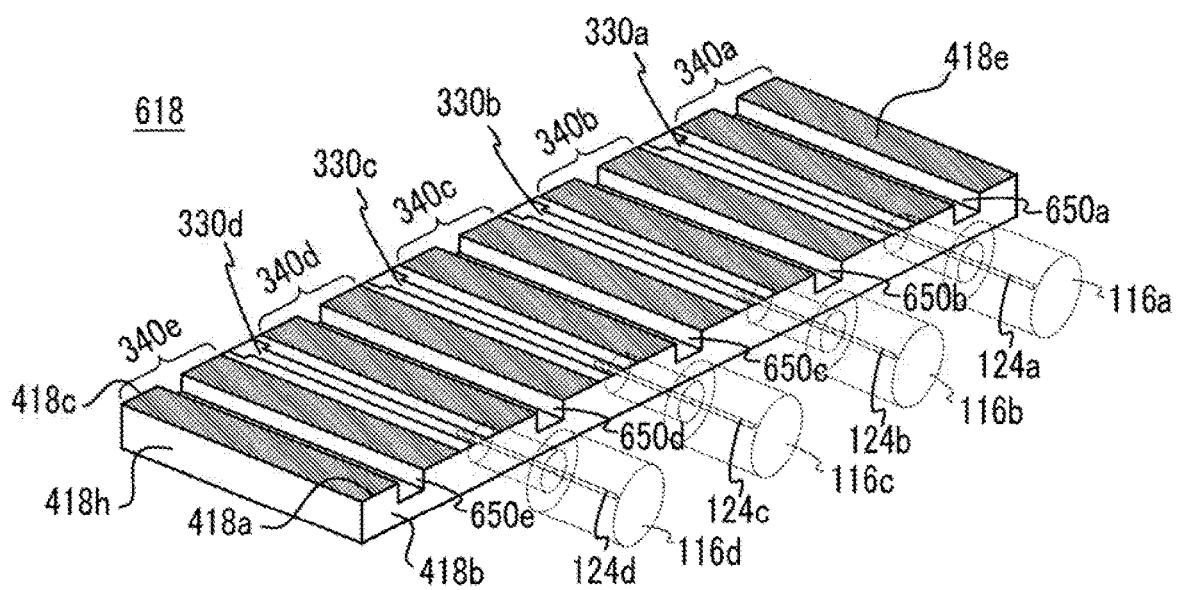
FIG. 6 is a diagram illustrating a second modification example of the relay substrate used in the optical modulator according to the first embodiment.

FIG. 6 is a diagram illustrating a configuration of a relay substrate 618 according to a second modification example. The relay substrate 618 can be used instead of the relay substrate 118 in the optical modulator 100 shown in FIG. 1. In FIG. 6, the same reference numerals as those in FIG. 4 are used for the same components as those of the relay substrate 118 shown in FIG. 4, and the above description of FIG. 4 is adopted.

The relay substrate 618 shown in FIG. 6 has the same configuration as that of the relay substrate 118 shown in FIG. 4, except that grooves 650a, 650b, 650c, 650d, and 650e are provided instead of the grooves 350a, 350b, 350c, 350d, and 350e. The grooves 650a, 650b, 650c, 650d, and 650e have a partially similar configuration to the grooves 350a, 350b, 350c, 350d, and 350e, but are different in that the grooves extend from the signal input side 418a of the relay substrate 618 up to the signal output side 418c of the relay substrate 618, where an electrical signal is output from the signal conductor pattern 330 to the signal electrode 112 of the optical modulation element 102.

In other words, the present modification example corresponds to the case where the length L2 of the groove 350 is set to the same value as the width Ws (see FIG. 3) of the relay substrate 118 in the relay substrate 118 shown in FIG. 3 (L2=Ws). Hereinafter, the grooves 650a, 650b, 650c, 650d, and 650e are collectively referred to as a groove 650. In addition, this example is an example, and in a case where the groove 350 is not a straight line, it is not established that (L2=Ws).

In the relay substrate 618 having the above-described configuration, the propagation of the propagation radiation microwaves that can be generated from each part in the longitudinal direction of the signal conductor pattern 330 into the relay substrate 618 is continuously suppressed by the groove 650 from the signal input side 418a to the signal output side 418c, so the transfer of high-frequency energy between the signal conductor patterns 330 is further reduced as compared with the relay substrate 118 of FIG. 4. Further, since the groove 650 is formed so as to reach the signal output side 418c from the signal input side 418a in this way, the structure of the relay substrate 618 is simplified, and thus the relay substrate 618 is manufactured more easily compared to the relay substrate 118 of FIG. 4.

Note that the above-described effect of reducing the transfer of high-frequency energy is strengthened by forming a metal film on the two inner surfaces of each groove 650 (that is, two inner surfaces facing each other in the direction of the signal input side 418a of the relay substrate 618). Further, if a metal film is also formed on the bottom surface (surface parallel to the front surface 418e) of each groove 650, the energy of the microwave that propagates through the relay substrate 618 and is emitted from the bottom surface to the air is also reduced, so crosstalk between the signal conductor patterns 330 can be further reduced.

Here, in a case where a metal film is formed on the bottom surface of the groove 650, when the relay substrate 618 is fixed to the housing 104 using solder or brazing material, the solder or brazing material that protrudes from the rear surface 418f of the relay substrate 618 may reach the metal film on the bottom surface of the groove 650 and reach the ground conductor pattern 340 through the metal film on the inner surface of the groove 650. Solder or brazing material that reaches the ground conductor pattern 340 makes it difficult to weld the wire in the ground conductor pattern 340, for example, during wire bonding between the ground electrode 122 of the optical modulation element 102 and the ground conductor pattern 340. Therefore, in a case where the solder or brazing material reaches the ground conductor pattern 340 through the metal film of the groove 650, for example, the metal film may be formed on the bottom surface of the groove 650 in the vicinity of the signal output side 418c.

In the present modification example, since the groove 650 is provided up to the signal output side 418c, in a case where the confinement strength of the high-frequency signal in the signal conductor pattern 330 is weak, or there is a difference in the consistency of the propagation mode at the signal output point of the signal output side 418c (the connection point of the signal conductor pattern 330 and the signal electrode 112), the disturbance (reflection or radiation of a high-frequency electrical signal) of the propagation mode may occur due to the presence of the groove 650 at the signal output point of the signal output side 418c. Therefore, it can be said that the present modification example is a suitable configuration in a case where it is desired to simplify the structure of the relay substrate 618 while facilitating its manufacture, and further reduce the crosstalk between the signal conductor patterns 330, particularly in the design in which the confinement strength of the high-frequency signal in the signal conductor pattern 330 is sufficiently secured.

Third Modification Example

Figure 7:
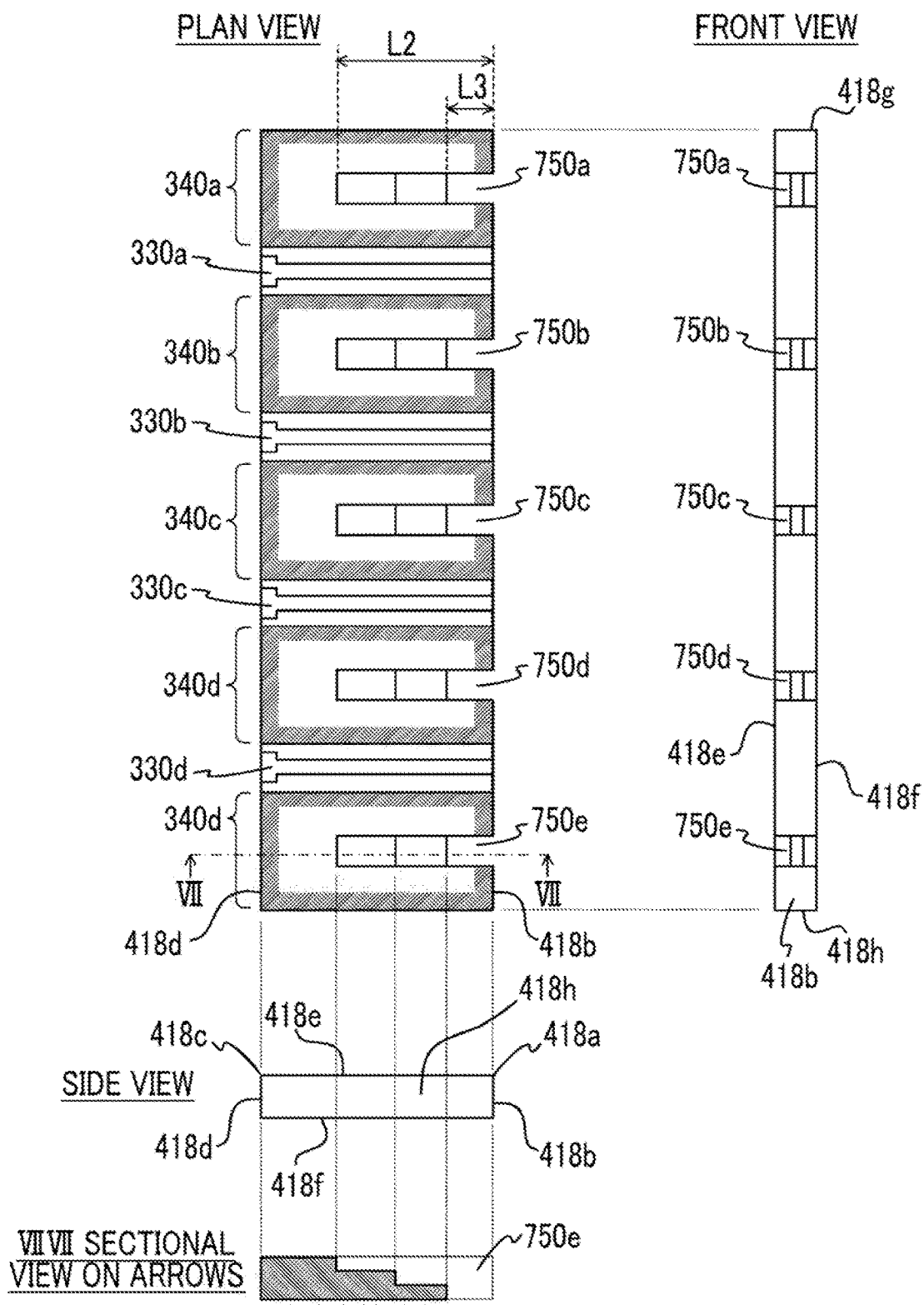
FIG. 7 is a diagram illustrating a third modification example of the relay substrate used in the optical modulator according to the first embodiment.

FIG. 7 is a diagram illustrating a configuration of a relay substrate 718 according to a third modification example. The relay substrate 718 can be used instead of the relay substrate 118 in the optical modulator 100 shown in FIG. 1. FIG. 7 is different from FIG. 4 in that the configuration of the relay substrate 718 is shown using a three-view drawing instead of a perspective view. In FIG. 7, the same reference numerals as those in FIG. 4 are used for the same components as those of the relay substrate 118 shown in FIG. 4, and the above description of FIG. 4 is adopted.

The relay substrate 718 shown in FIG. 7 has the same configuration as that of the relay substrate 118 shown in FIG. 4, except that groove 750a, 750b, 750c, 750d, and 750e are provided instead of the grooves 350a, 350b, 350c, 350d, and 350e.

Different from the grooves 350, the grooves 750a, 750b, 750c, 750d, and 750e are formed such that the depths of the ends of these grooves 750a, 750b, 750c, 750d, and 750e measured from the front surface 418e at the signal input side 418a are deeper than the depths of the grooves 750a, 750b, 750c, 750d, and 750e measured from the front surface 418e at the other ends of these grooves 750a, 750b, 750c, 750d, and 750e. Specifically, the grooves 750a, 750b, 750c, 750d, and 750e have the bottom surfaces formed stepwise, and are formed so as to penetrate through to the rear surface 418f of the relay substrate 518, in a range of a predetermined distance L3 (e<b) from the signal input side 418a.

That is, the grooves 750a, 750b, 750c, 750d, and 750e are formed such that the depths thereof increase stepwise (in the present modification example, in two steps) and the grooves reach the rear surface 418f at a predetermined distance L3 from the signal input side 418a. In other words, the grooves 750a, 750b, 750c, 750d, and 750e are formed such that the depths thereof decrease stepwise toward the signal output side 418c. Hereinafter, the grooves 750a, 750b, 750c, 750d, and 750e are collectively referred to as a groove 750.

In the relay substrate 718 having the above-described configuration, the portion of the groove 750 in a range of a predetermined distance L3 from the signal input side 418a is provided to penetrate to the rear surface 418f, so propagation of the connection point radiation microwave and the propagation radiation microwave at the input connection point and in the vicinity thereof into the relay substrate 718 is effectively suppressed, as in the Modification Example 1.

Further, in the relay substrate 718, the groove 750 is formed such that it extends longer than the groove 350 of the relay substrate 118 toward the signal output side 418c and the depth thereof decreases stepwise. Therefore, the disturbance of the propagation mode in the signal conductor pattern 330 that may occur due to the presence of the groove 750 decreases stepwise toward the signal output side 418c and does not occur in the signal output side 418c. On the other hand, since the propagation radiation microwaves generated from each part in the length direction of the signal conductor pattern 330 gradually decrease toward the signal output side 418c, even if the depth of the groove 750 decreases stepwise toward the signal output side 418c, the amount of the propagation radiation microwaves generated from each part of the signal conductor pattern 330 and propagating through the relay substrate 718 can be suppressed to a substantially constant value along the longitudinal direction of the signal conductor pattern 330.

Therefore, in the relay substrate 718, while the disturbance of the propagation mode of the signal conductor pattern 330 due to the presence of the groove 750 is smoothly eliminated toward the signal output side 418c, the high-frequency energy transfer between the signal conductor patterns 330 through the connection point radiation microwaves and the propagation radiation microwaves can be effectively reduced.

Here, in the present modification example, it is desirable that the predetermined distance L3 of the portion in which the groove 750 extends up to the rear surface 418f of the relay substrate 718 satisfies either of the followings from the same reason as the length L2 in the relay substrate 118 (suppression of propagation of connection point radiation microwaves and propagation radiation microwaves described above).

$$L3 > L1 \quad (3)$$

$$L3 > W \quad (4)$$

In Expressions (3) and (4), L1 and W are the terminal extension length and the width of the groove 750, respectively, defined in the same manner as the example of the relay substrate 118 described above.

In the present modification example, the groove 750 is deeply formed in two steps up to the rear surface 418f, but the number of steps is not limited to two. For example, the number of steps may be one. That is, the depth of the groove 750 may be constant from the position of the predetermined distance L3 to the end of the groove 750. Alternatively, the number of steps may be three or more.

Alternatively, the depth of the groove 750 may be configured to be continuously deep from the end of the groove 750. In this case, the bottom surface of the groove 750 can reach the rear surface 418f at the signal input side 418a (that is, L3=0 can be set).

In the present modification example, the groove 750 reaches the rear surface 418f at least at the signal input side 418a, but the present invention is not limited to this. The grooves 750 may be formed such that the depth measured from the front surface 418e at the signal input side 418a is deeper than the depth measured from the front surface 418e at the ends of the grooves 750. For example, even if the groove 750 does not necessarily reach the rear surface 418f at the signal input side 418a, the same effect as described above can be achieved.

Even in the modification example, as in the case of the relay substrates 118, 518, and 618, the above-described effect of reducing the transfer of high-frequency energy can be strengthened by forming a metal film on the two inner surfaces of the groove 750 or the two inner surfaces and the bottom surface of the groove 750.

Fourth Modification Example

Figure 8:
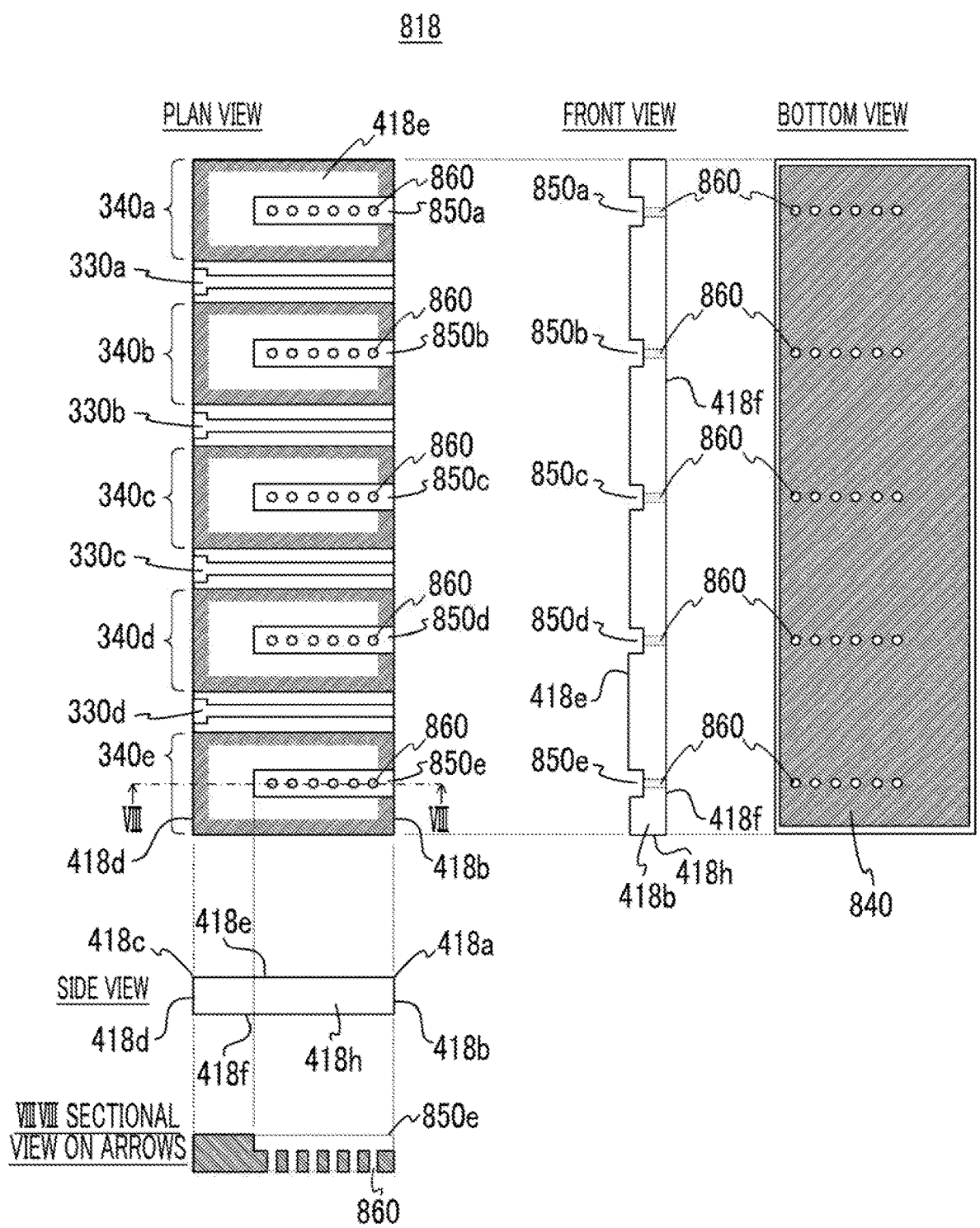
FIG. 8 is a diagram illustrating a fourth modification example of the relay substrate used in the optical modulator according to the first embodiment.

FIG. 8 is a diagram illustrating a configuration of a relay substrate 818 according to a fourth modification example. The relay substrate 818 can be used instead of the relay substrate 118 in the optical modulator 100 shown in FIG. 1. In FIG. 8, the same reference numerals as those in FIG. 4 are used for the same components as those of the relay substrate 118 shown in FIG. 4, and the above description of FIG. 4 is adopted.

The relay substrate 818 shown in FIG. 8 has the same configuration as that of the relay substrate 118 shown in FIG. 4, except that a ground conductor 840 that is in contact with the housing 104 and has a ground potential is provided on the rear surface 418f. The relay substrate 818 is different from the relay substrate 118 in that grooves 850a, 850b, 850c, 850d, and 850e are provided instead of the grooves 350a, 350b, 350c, 350d, and 350e. Hereinafter, the grooves 850a, 850b, 850c, 850d, and 850e are collectively referred to as a groove 850.

The groove 850 has the same configuration as that of the groove 350, but is different from the groove 350 in that a metal film is formed on the bottom surface and two inner surfaces thereof, and six vias 860 are provided on each of the bottom surfaces. In FIG. 8, for ease of understanding, only the rightmost via in the drawing of the groove 850 is denoted by reference numeral 860, but it is to be understood that five vias drawn in circles with the same diameter as the vias on the left side of the via with the reference numeral 860 attached thereto are also the vias 860.

These vias 860 electrically connect the metal film on the bottom surface of the groove 850 and the ground conductor 840 formed on the rear surface 418f of the relay substrate 818. Accordingly, the ground conductor 840 on the rear surface 418f is electrically connected to the ground conductor pattern 340 on the front surface 418e through the via 860 and the metal film provided on the bottom surface and the two inner surfaces of the groove 850.

Since the relay substrate 818 having the above-described configuration is formed with the via 860 that connects the metal film on the bottom surface of the groove 850 and the ground conductor 840 on the rear surface 418f of the relay substrate 818, it is possible to block the radiation microwaves that are to propagate inside the relay substrate 818 through the groove 850 of the above-described two radiation microwaves (connection point radiation microwaves and propagation radiation microwaves). Therefore, in the relay substrate 818, high-frequency energy transfer between the signal conductor patterns 330 through the two radiation microwaves can be suppressed.

Further, since the ground conductor pattern 340 on the front surface 418e and the ground conductor 840 on the rear surface 418f are connected by the via 860 having a length shorter than the thickness of the relay substrate 818, a higher ground effect than that of the relay substrate 118 (uniform ground potential distribution) can be achieved. In the present embodiment, the number of vias is six, but the present invention is not limited to this. The vias have the same outer diameter, but may have different outer diameters as long as the above effects are achieved. In particular, in a case where the outer diameter of the via on the connection point side between the signal input terminal and the signal conductor pattern is made larger than the outer diameters of the other vias, it is possible to obtain a higher ground effect (such as uniform ground potential distribution) at the connection point between the signal input terminal and the signal conductor pattern where the above two radiation microwaves are likely to occur, while maintaining the mechanical strength of the substrate.

Fifth Modification Example

Figure 9:
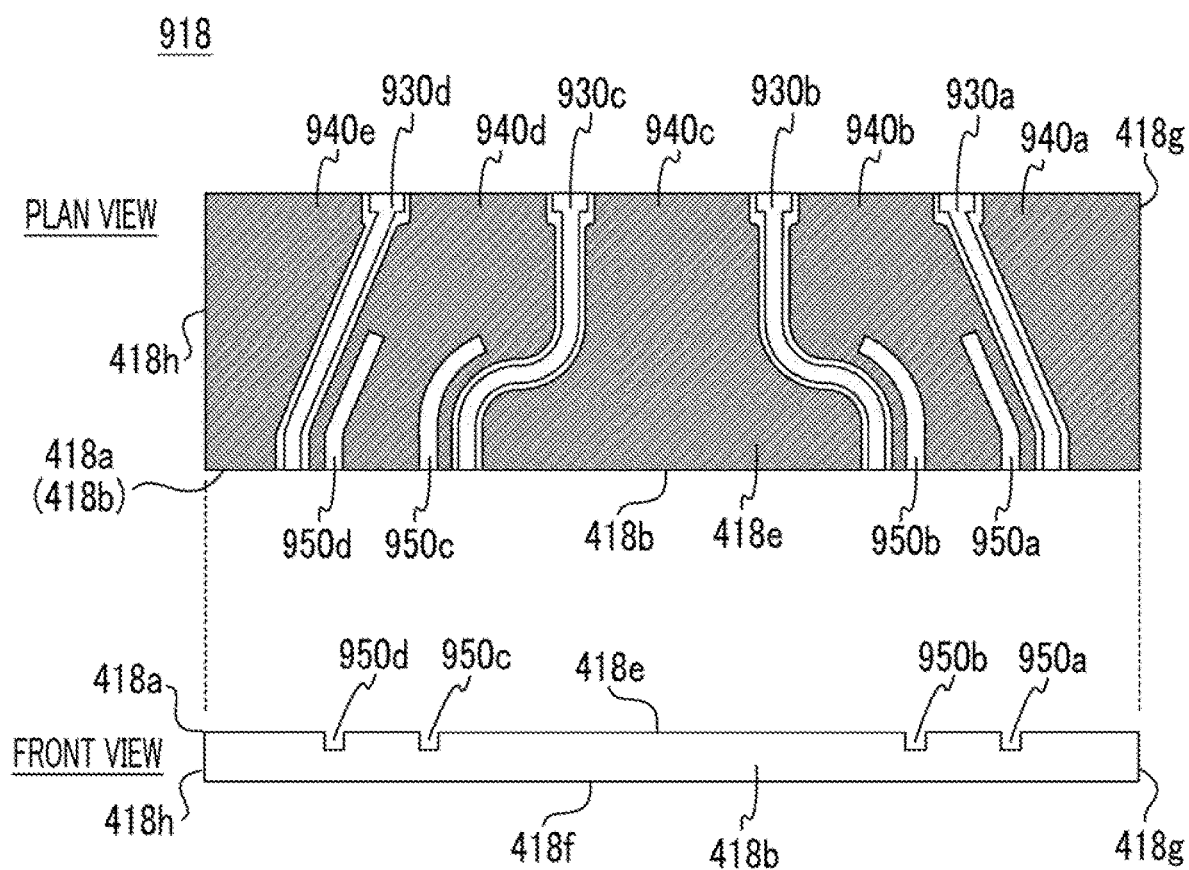
FIG. 9 is a diagram illustrating a fifth modification example of the relay substrate used in the optical modulator according to the first embodiment.

FIG. 9 is a diagram illustrating a configuration of a relay substrate 918 according to a fifth modification example. The relay substrate 918 can be used instead of the relay substrate 118 in the optical modulator 100 shown in FIG. 1. In FIG. 9, the same reference numerals as those in FIG. 4 are used for the same components as those of the relay substrate 118 shown in FIG. 4, and the above description of FIG. 4 is adopted.

The relay substrate 918 shown in FIG. 9 has the same configuration as that of the relay substrate 118 shown in FIG. 4, except that signal conductor patterns 930a, 930b, 930c, and 930d are provided instead of the signal conductor patterns 330a, 330b, 330c, and 330d. Hereinafter, the signal conductor patterns 930a, 930b, 930c, and 930d are collectively referred to as a signal conductor pattern 930.

The signal conductor patterns 930a, 930b, 930c, and 930d have the same configuration as the signal conductor patterns 330a, 330b, 330c, and 330d, but have the planar shape on the relay substrate 918 different from the signal conductor patterns 330a, 330b, 330c, and 330d.

That is, each of the signal conductor patterns 330a, 330b, 330c, and 330d is formed as a linear shape extending in a direction orthogonal to the signal input side 418a, whereas each of the signal conductor patterns 930a, 930d is configured to include a straight line extending at an angle in the direction different from the direction orthogonal to the signal input side 418a. Each of the signal conductor patterns 930b and 930c includes a curved portion.

Thus, in the relay substrate 918, on the signal input side 418a, the ends of the signal conductor pattern 930a and 930b are disposed adjacent to the right side in FIG. 9 to form one group, and the ends of the signal conductor patterns 930c and 930d are disposed adjacent to the left side in FIG. 9 to form another group. For example, in a case where the optical modulation element 102 is a small-sized and integrated modulator such as a DP-QPSK modulator, such grouping of the ends of the signal conductor patterns 930 on the signal input side 418a can be employed in a case where two groups of high-frequency electrical signals are respectively input to two nested Mach-Zehnder modulators which modulate two orthogonal polarized light beams, respectively.

The relay substrate 918 is different from the relay substrate 118 in that ground conductor patterns 940a, 940b, 940c, and 940d are provided instead of the ground conductor patterns 340a, 340b, 340c, and 340d. Hereinafter, the ground conductor patterns 940a, 940b, 940c, and 940d are collectively referred to as a ground conductor pattern 940.

The ground conductor pattern 940 has the same configuration as that of the ground conductor pattern 340, but is different in that an edge adjacent to the signal conductor pattern 930 is formed in a straight line and/or a curved line so as to form a coplanar line in accordance with the shape of the signal conductor pattern 930.

The relay substrate 918 is different from the relay substrate 118 in that groove 950a, 950b, 950c, 950d, and 950e are provided instead of the grooves 350a, 350b, 350c, 350d, and 350e. Hereinafter, the grooves 950a, 950b, 950c, 950d, and 950e are collectively referred to as a groove 950.

Here, the grooves 950a, 950b, 950c, 950d, and 950e have the same configuration as the grooves 350a, 350b, 350c, 350d, and 350e, but are different from the grooves 350a, 350b, 350c, 350d, and 350e in the following points.

First, in the relay substrate 118 in FIG. 4, one groove 350 is provided in each of the ground conductor patterns 340, whereas in the relay substrate 918 in FIG. 9, no groove is provided in the ground conductor patterns 940a, 940e that are not sandwiched between the adjacent signal conductor patterns 930. This is because in the relay substrate 918, propagation radiation microwaves propagating from the signal conductor patterns 930a and 930d toward the right side surface 418g and the left side surface 418h of the relay substrate 918, respectively do not reach the other signal conductor patterns 930 directly, which does not contribute much to the crosstalk between the signal conductor patterns 930.

In the relay substrate 918, the ends of the signal conductor patterns 930b and 930c on the signal input side 418a are formed so as to be separated from each other such that no significant crosstalk occurs. Therefore, in the relay substrate 918, no groove is provided in the ground conductor pattern 940c sandwiched between the signal conductor patterns 930b, 930c.

In the relay substrate 918, two grooves 950a, 950b each having a straight line and a curved line are provided on the ground conductor pattern 940b sandwiched between the signal conductor patterns 930a, 930b so as to follow the respective shapes of the signal conductor patterns 930a, 930b. In addition, in the relay substrate 918, two grooves 950c, 950d each having a curved line and a straight line are provided on the ground conductor patterns 940d sandwiched between the signal conductor patterns 930c, 930d so as to follow the respective shapes of the signal conductor patterns 930c, 930d.

In the relay substrate 918 having the above configuration, the number and shape of grooves provided in the ground conductor pattern 940 are determined in accordance with the shape of the signal conductor pattern 930. That is, a groove is not provided in the propagation path of the radiation microwave that does not substantially contribute to the occurrence of crosstalk between the adjacent signal conductor patterns 330 (in the present modification example, the substrate portion of the relay substrate 918 on which the ground conductor patterns 940a, 940c, and 940d are formed). Therefore, the relay substrate 918 can be manufactured easily and inexpensively by simplifying the processing steps.

In the relay substrate 918, in the propagation path of two radiation microwaves (connection point radiation microwaves and propagation radiation microwaves) that can be sandwiched between two signal conductor patterns 930 and cause crosstalk between the signal conductor patterns 930 (in the present modification example, the substrate portion on which the ground conductor patterns 940b, 940d are formed), a groove 950 having a linear portion or a curved portion along the shape of the signal conductor pattern 930 at a position adjacent to each signal conductor pattern 930 having a curved portion is provided.

Thus, on the relay substrate 918, two radiation microwaves can be prevented from propagating through the relay substrate 918 between the adjacent signal conductor patterns 930, and the propagation of unnecessary microwaves radiated from the curved portion of the signal conductor pattern 930 can also be suppressed.

In the present modification example, two respective grooves 950a, 950b, and 950c, 950d are respectively provided in the ground conductor patterns 940b, 940d configured as one ground conductor pattern, but the present invention is not limited thereto. For example, the ground conductor pattern 940b may be divided into right and left in the drawing, a groove 950a may be formed in the divided right portion of the drawing, and a groove 950b may be provided in the divided left portion of the drawing. Similarly, the ground conductor pattern 940d may be divided into right and left in the drawing, a groove 950c may be formed in the divided right portion of the drawing, and a groove 950d may be provided in the divided left portion of the drawing.

Second Embodiment

Next, a second embodiment of the present invention will be described. The present embodiment is an optical transmission apparatus mounted with an optical modulator related to either of the optical modulator 100 according to the first embodiment or the optical modulators 100 including the relay substrates 518, 618, 718, 818, and 918 according to the first to fifth modification examples of the first embodiment.

Figure 10:
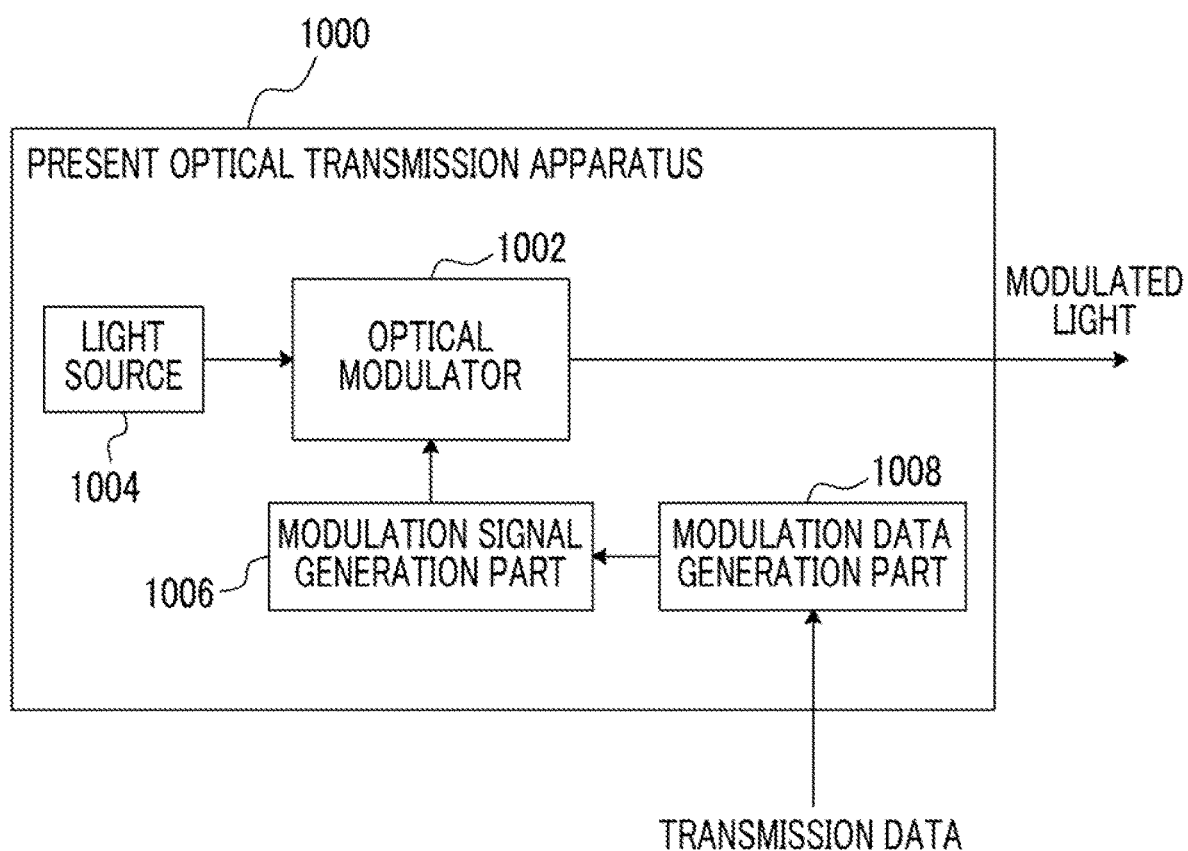
FIG. 10 is a diagram illustrating a configuration of an optical transmission apparatus according to a second embodiment of the present invention.

FIG. 10 is a diagram illustrating a configuration of an optical transmission apparatus according to the present embodiment. The present optical transmission apparatus 1000 includes an optical modulator 1002, a light source 1004 that inputs light to the optical modulator 1002, a modulation signal generation part 1006, and a modulation data generation part 1008.

The optical modulator 1002 may be an optical modulator related to either of the optical modulator 100 according to the first embodiment, or the optical modulators 100 including the relay substrates 518, 618, 718, 818, and 918 according to the first to fifth modification examples of the first embodiment. Here, in order to avoid redundant descriptions and facilitate understanding, it is assumed that the optical modulator 1002 is the optical modulator 100 including the relay substrate 118 below.

The modulation data generation part 1008 receives transmission data given from the outside, generates modulation data for transmitting the transmission data (for example, data obtained by converting or processing transmission data into a predetermined data format), and outputs the generated modulation data to the modulation signal generation part 1006.

The modulation signal generation part 1006 is an electronic circuit (drive circuit) that outputs an electrical signal for causing the optical modulator 1002 to perform a modulation operation, generates a modulation signal which is a high-frequency signal for making the optical modulator 1002 perform an optical modulation operation according to the modulation data, based on the modulation data which is output by the modulation data generation part 1008, and inputs the generated modulation signal to the optical modulator 1002. The modulation signal includes four high-frequency electrical signals corresponding to the four signal electrodes 112a, 112b, 112c, and 112d of the optical modulation element 102 provided in the optical modulator 1002.

The four high-frequency electrical signals are input from the signal input terminals 124a, 124b, 124c, and 124d of the electrical connectors 116a, 116b, 116c, and 116d of the optical modulator 1002 to the signal conductor patterns 330a, 330b, 330c, and 330d on the relay substrate 118, and are input to the signal electrodes 112a, 112b, 112c, and 112d of the optical modulation element 102 through the signal conductor pattern 330a.

Thus, the light output from the light source 1004 is, for example, DP-QPSK modulated by the optical modulator 1002 and output as modulated light from the optical transmission apparatus 1000.

In particular, in the optical transmission apparatus 1000, as the optical modulator 1002, an optical modulator related to either of the optical modulator 100 according to the first embodiment, or the optical modulators 100 including the relay substrates 518, 618, 718, 818, and 918 according to the first to fifth modification examples of the first embodiment is used. Therefore, in the optical transmission apparatus 1000, it is possible to secure stable and good optical modulation characteristics by effectively reducing crosstalk between a plurality of high-frequency electrical signals that drive the optical modulation element 102 accompanying an increase in transmission rate, and thus stable and good transmission characteristics can be realized.

The present invention is not limited to the configurations of the above-described embodiment and modification examples, and can be realized in various aspects without departing from the spirit thereof.

For example, in the above-described embodiments and modification examples, the preferable size conditions indicated by Expressions (1) and (2) for the groove 350 shown in the description of the relay substrate 118 can be applied similarly to grooves 550, 650, 750, 850, and 950 on the relay substrates 518, 618, 718, 818, and 918. In this case, since the length L2 of the groove is defined as the length that the groove extends, in the example of the groove 950, it is the length measured along the shape of the groove 950 formed in a straight line or a curved line.

In addition, for example, even if a single relay substrate is configured by combining the characteristic portions of the relay substrates 118, 518, 618, 718, 818, and 918 shown in the above-described embodiments and modification examples, the same effects as those shown in the above-described modification examples can be achieved. For example, a plurality of grooves each having the same configuration as the grooves 350, 550, 650, 750, 850, and 950 are mixed in a plurality of ground conductor patterns, and at least one groove can be provided in at least one ground conductor pattern formed on the front surface 418e.

Alternatively, in the relay substrates 618, 718, and 918, a metal film may be provided on the entire inner surfaces of the grooves 650, 750, and 950, a metal film may be provided on the rear surface 418f, and a via similar to that of the relay substrate 818 may be provided. Alternatively, in the relay substrate 618, the depth of the groove 650 may change stepwise or continuously as in the relay substrate 718. In this case, for example, the groove 650 may be configured such that the depth thereof changes stepwise or continuously within a range not reaching the rear surface 418f.

As described above, the optical modulator 100 described above includes the optical modulation element 102 including the plurality of signal electrodes 112, the plurality of signal input terminals 124 for inputting the electrical signals applied to the signal electrodes 112, and a relay substrate 118 on which a plurality of signal conductor patterns 330 and a plurality of ground conductor patterns 340 electrically connecting the signal input terminals 124 and the signal electrodes 112 are formed. In addition, the optical modulator 100 includes a housing 104 that houses the optical modulation element 102 and the relay substrate 118. On the signal input side 418a of the relay substrate 118 where the electrical signal from the signal input terminal 124 is input to the signal conductor pattern 330, the signal input terminal 124 is disposed to extend from the signal input side 418a onto the signal conductor pattern 330. The relay substrate 118 has at least one groove 350 extending from the signal input side 418a, in at least one ground conductor pattern 340 formed between adjacent signal conductor patterns 330, on the front surface 418e on which the signal conductor pattern 330 is formed. The groove 350 is formed such that the length extending from the signal input side 418a is longer than the length of the signal input terminal 124 extending from the signal input side 418a.

According to this configuration, two radiation microwaves of a radiation mode generated from the signal conductor pattern 330 in the vicinity of the input connection point due to the propagation of the high-frequency signal by the groove 350 provided in the relay substrate 118 (propagation radiation microwaves) and a radiation mode generated along with different mode conversion at the connection point between the signal input terminal 124 and the signal conductor pattern 330 (connection point radiation microwaves) are suppressed from propagating in the relay substrate 118, and the generation of high-frequency energy transfer between adjacent signal conductor patterns 330 can be suppressed. That is, in the optical modulator 100, since the transfer of the high-frequency energy is suppressed by the groove 350 having a simple configuration provided in the relay substrate 118, it is possible to realize good optical modulation characteristics, by effectively suppressing an increase in a crosstalk between signal conductor patterns 330 due to an increase in a transmission rate, without increasing the cost and ensuring ease of manufacture, without violating the demand for downsizing of the optical modulator 100.

Further, a relay substrate 618 provided with a groove 650 different from the groove 350 can be used for the optical modulator 100. The groove 650 is formed so as to extend up to a signal output side 418c of the relay substrate 118, where an electrical signal is output from the signal conductor pattern 330 to the signal electrode 112 of the optical modulation element 102.

According to this configuration, the propagation of the propagation radiation microwaves that can be generated from each part in the longitudinal direction of the signal conductor pattern 330 into the relay substrate 618 is continuously suppressed by the groove 650 from the signal input side 418a to the signal output side 418c. Therefore, the transfer of high-frequency energy between the signal conductor patterns 330 is further reduced as compared with the relay substrate 118. Further, since the groove 650 is formed so as to reach the signal output side 418c from the signal input side 418a in this way, the structure of the relay substrate 618 is simplified, so the manufacture becomes easy.

Further, a relay substrate 718 provided with a groove 750 different from the groove 350 can be used for the optical modulator 100. The groove 750 is formed such that the depth of the end of the groove 750 measured from the front surface 418e of the relay substrate 718 at the signal input side 418a is deeper than the depth of the groove 750 measured from the front surface 418e at the other end of the groove 750.

According to this configuration, the groove 750 is formed such that the depth becomes shallower as it goes away from the signal input side 418a, so the disturbance of the propagation mode in the signal conductor pattern 330 that may occur due to the presence of the groove 750 decreases toward the signal output side 418c. Since the large portion of the propagation mode disturbance corresponds to the portion where the groove 750 is formed more deeply, the propagation in a part where the disturbance is large and the propagation microwaves are frequently generated is more effectively suppressed than a deeper groove part. Therefore, in the relay substrate 718, while the disturbance of the propagation mode of the signal conductor pattern 330 due to the presence of the groove 750 is smoothly eliminated toward the signal output side 418c, the high-frequency energy transfer between the signal conductor patterns 330 through the connection point radiation microwaves and the propagation radiation microwaves can be suppressed to a certain level or less along the longitudinal direction of the signal conductor pattern 330.

Further, in the relay substrate 718, the groove 750 is formed such that the depth measured from the front surface 418e of the relay substrate 718 becomes stepwise or continuous in depth from the other end of the groove 750 toward the signal input side 418a. According to this configuration, the groove whose depth changes can be formed with a simple configuration.

Further, in the relay substrate 718, the groove 750 is formed up to the rear surface 418f facing the front surface 418e of the relay substrate 718 at the signal input side 418a, or is formed up to the rear surface 418f facing the front surface 418e of the relay substrate 718 within a range of a predetermined distance L3 from the signal input side 418a.

According to this configuration, at the signal input side 418a where connection point radiation microwaves and propagation radiation microwaves are most likely to be generated or in the vicinity thereof, the effect of suppressing the propagation of the connection point radiation microwaves and propagation radiation microwaves into the relay substrate 718 can be strengthened.

In addition, a metal film may be formed on the inner surface of the grooves 350, 650, 750, and 950 of the relay substrates 118, 618, 718, and 918. According to this configuration, the effect of suppressing the propagation of the connection point radiation microwaves and propagation radiation microwaves into these relay substrates by these grooves can be strengthened.

Further, the grooves 350, 650, 750, and 950 of the relay substrates 118, 618, 718, and 918 may further have a metal film formed on their bottom surfaces. According to this configuration, it is possible to enhance the effect of suppressing the crosstalk between the signal conductor patterns 330 by suppressing the connection point radiation microwave and the propagation radiation microwave propagating in the relay substrate from being radiated into the air from the bottom surfaces of these grooves.

Further, a relay substrate 818 provided with a groove 850 different from the groove 350 can be used for the optical modulator 100. A ground conductor 840 is formed on the rear surface 418f facing the front surface 418e of the relay substrate 818, and a via 860 that connects a metal film on the bottom surface and a ground conductor 840 of the rear surface 418f of the relay substrate 818 is formed on the bottom surface of the groove 850.

According to this configuration, since the via 860 that connects the metal film on the bottom surface of the groove 850 and the ground conductor 840 on the rear surface 418f of the relay substrate 818 is formed, it is possible to block the radiation microwaves that are to propagate inside the relay substrate 818 through the groove 850, of the above-described connection point radiation microwaves and propagation radiation microwaves. Therefore, in the relay substrate 818, high-frequency energy transfer between the signal conductor patterns 330 through the connection point radiation microwaves and the propagation radiation microwaves can be further suppressed.

Further, a relay substrate 518 provided with a groove 550 different from the groove 350 can be used for the optical modulator 100. The groove 550 does not extend up to a signal output side 418c of the relay substrate 518, where an electrical signal is output from the signal conductor pattern 330 to the signal electrode 112 of the optical modulation element 102, and the entire of each of the grooves 550 is formed so as to penetrate to a rear surface 418f of the relay substrate 518 facing the front surface 418e.

According to this configuration, since the entire of each of the grooves 550 penetrates up to the rear surface 418f facing the front surface 418e of the relay substrate 518, the propagation of the connection point radiation microwave and the propagation radiation microwave generated at the input connection point and the vicinity thereof into the relay substrate 518 is further suppressed.

Further, in the relay substrate 518, a metal film is further formed on the inner surface of the groove 550 formed so as to penetrate from the front surface 418e to the rear surface 418f. According to this configuration, since the metal film is formed on the inner surface of the groove 550, the effect of suppressing the propagation of the connection point radiation microwave and the propagation radiation microwave, and therefore the effect of reducing the transfer of high-frequency energy between the signal conductor patterns 330 through these radiation microwaves can be further strengthened.

In the relay substrates 118, 518, 618, 718, 818, and 918 of the optical modulator 100, the grooves 350, 550, 650, 750, 850, and 950 are formed such that the length L2 extending from the signal input side 418a is longer than the width W measured along the direction orthogonal to the extending direction. According to this configuration, it is possible to effectively suppress the propagation of connection point radiation microwaves and propagation radiation microwaves, which can be generated from each part in the longitudinal direction of the signal conductor pattern 330 along with the propagation of the high frequency signal, into these relay substrates.

The optical modulator 100 including any of the above-described relay substrates 118, 518, 618, 718, 818, and 918 constitutes the optical transmission apparatus 1000 together with the modulation signal generation part 1006 which is an electronic circuit that outputs an electrical signal for causing the optical modulator 100 to perform a modulation operation. According to this configuration, it is possible to realize stable and good transmission characteristics, by effectively reducing crosstalk between a plurality of high-frequency electrical signals that drive the optical modulation element 102 due to an increase in transmission rate.

What is claimed is:
1. An optical modulator comprising:
an optical modulation element having a plurality of signal electrodes;
a plurality of signal input terminals each of which inputs an electrical signal to be applied to each of the signal electrodes;
a relay substrate on which a plurality of signal conductor patterns that electrically connect each of the signal input terminals to each of the signal electrodes, and a plurality of ground conductor patterns are formed; and
a housing that houses the optical modulation element and the relay substrate;
wherein on a signal input side of the relay substrate where the electrical signal from the signal input terminal is input to the signal conductor pattern, the signal input terminal is disposed to extend from the signal input side onto the signal conductor pattern,
wherein the relay substrate has at least one groove extending from the signal input side, in at least one ground conductor pattern formed between the signal conductor patterns adjacent to each other, on a front surface on which the signal conductor pattern is formed, and wherein the groove is formed such that a length of the groove extending from the signal input side is longer than a length of the signal input terminal extending from the signal input side.

2. The optical modulator according to claim 1, wherein the groove extends up to a signal output side of the relay substrate, where an electrical signal is output from the signal conductor pattern to the signal electrode of the optical modulation element.

3. The optical modulator according to claim 1, wherein the groove is formed such that a depth of an end of the groove measured from the front surface at the signal input side is deeper than a depth of the groove measured from the front surface at the other end of the groove.

4. The optical modulator according to claim 3, wherein the groove is formed such that the depth measured from the front surface is deepened stepwise or continuously from the other end of the groove toward the signal input side.

5. The optical modulator according to claim 2, wherein the groove is formed up to a rear surface of the relay substrate facing the front surface at the signal input side, or is formed up to the rear surface of the relay substrate facing the front surface within a range of a predetermined distance from the signal input side.

6. The optical modulator according to claim 1, wherein a metal film is formed on an inner surface of the groove, or on the inner surface and a bottom surface of the groove.

7. The optical modulator according to claim 1, wherein a metal film is formed on an inner surface and a bottom surface of the groove, wherein a ground conductor is formed on a rear surface of the relay substrate facing the front surface, and wherein a via that connects the metal film on the bottom surface and the ground conductor on the rear surface is formed on the bottom surface of the groove.

8. The optical modulator according to claim 1, wherein the groove does not extend up to a signal output side of the relay substrate, where the electrical signal is output from the signal conductor pattern to the signal electrode of the optical modulation element, and the entire groove is formed so as to penetrate to a rear surface of the relay substrate facing the front surface.

9. The optical modulator according to claim 8, wherein a metal film is formed on an inner surface of the groove.

10. The optical modulator according to claim 1, wherein the groove is formed such that a length of the groove extending from the signal input side is longer than a width of the groove measured along a direction orthogonal to a direction of the extension.

11. An optical transmission apparatus comprising: the optical modulator according to claim 1; and an electronic circuit that outputs an electrical signal for causing the optical modulator to perform a modulation operation.

\* \* \* \* \*